United States Patent
Ash et al.

[11] Patent Number: 5,131,608
[45] Date of Patent: Jul. 21, 1992

[54] EJECTION SEATS FOR MILITARY AIRCRAFT

[75] Inventors: Geoffrey J. Ash; Timothy Valentine, both of Preston, England

[73] Assignee: British Aerospace plc, London, England

[21] Appl. No.: 678,195

[22] Filed: Apr. 1, 1991

[30] Foreign Application Priority Data

Apr. 10, 1990 [GB] United Kingdom ............... 9008045

[51] Int. Cl.⁵ .......................................... B64D 25/115
[52] U.S. Cl. ........................ 244/122 A; 244/122 AG
[58] Field of Search .... 244/122 A, 122 AG, 122 AH, 244/122 AB; 297/316, 322, 330

[56] References Cited

U.S. PATENT DOCUMENTS

| | | | |
|---|---|---|---|
| 2,702,677 | 2/1955 | Replogle | 244/122 A |
| 3,098,631 | 7/1963 | Hall et al. | 244/122 A |
| 3,647,168 | 3/1972 | Eggert, Jr. et al. | 244/122 A |
| 3,981,465 | 9/1976 | Sinnett et al. | 244/122 A |
| 4,004,763 | 1/1977 | Bunnell, III et al. | 244/122 AG X |
| 4,218,035 | 8/1980 | Jordan | 244/122 A X |
| 4,301,983 | 11/1981 | Horan | 244/122 AG X |
| 4,667,901 | 5/1987 | Herndon | 244/122 A X |
| 4,749,153 | 6/1988 | Herndon | 244/122 A X |
| 4,787,576 | 11/1988 | McGrady et al. | 244/122 R |

FOREIGN PATENT DOCUMENTS

1965978  1/1980  Fed. Rep. of Germany ... 244/122 A

OTHER PUBLICATIONS

European Search Report, Jul. 16, 1991, EP 91 10 4448.

Primary Examiner—Sherman Basinger
Assistant Examiner—Carla Mattix
Attorney, Agent, or Firm—Nixon & Vanderhye

[57] ABSTRACT

An ejection seat (1), supported on ejection gun guide rails (2) and moveable between an upright position to a reclining position thus affords the pilot greater protection from the effects of high "g" forces. Movement of the seat (1) is effected by hydraulic acutators (3), (4), guided by an arcuate track (15). The invention has the further advantage of allowing ejection from an upright or a reclining position or any intermediate transitional position.

5 Claims, 6 Drawing Sheets

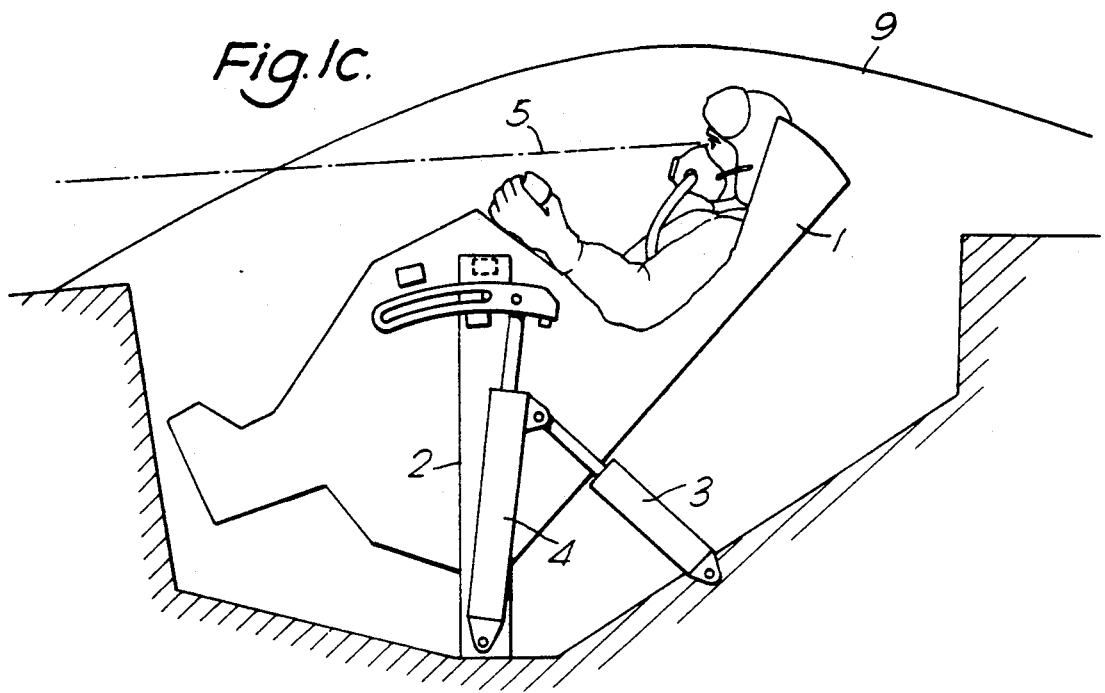
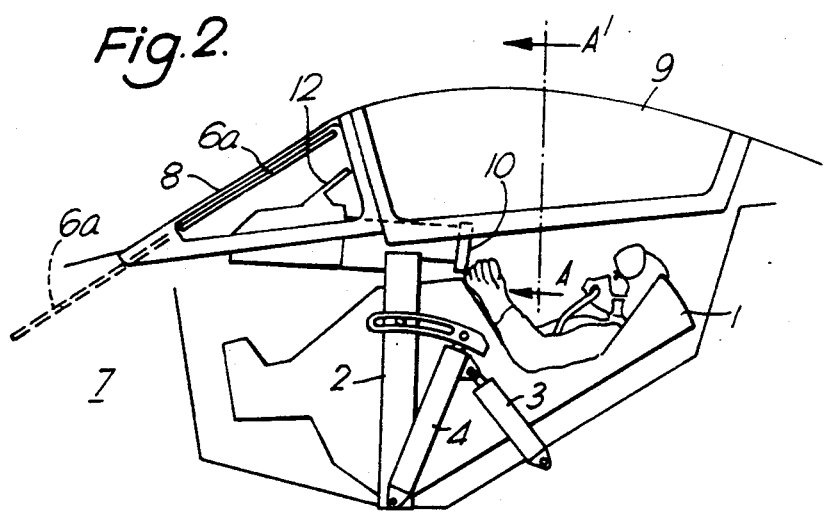

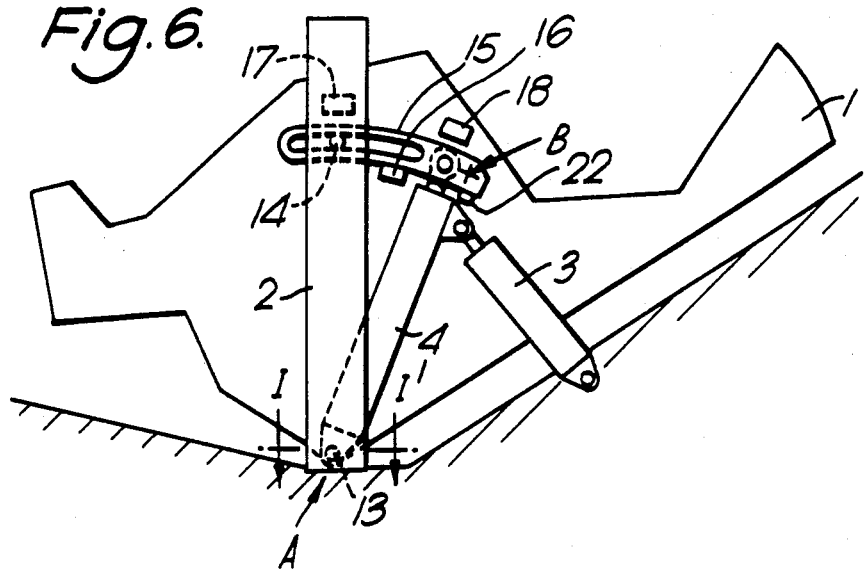
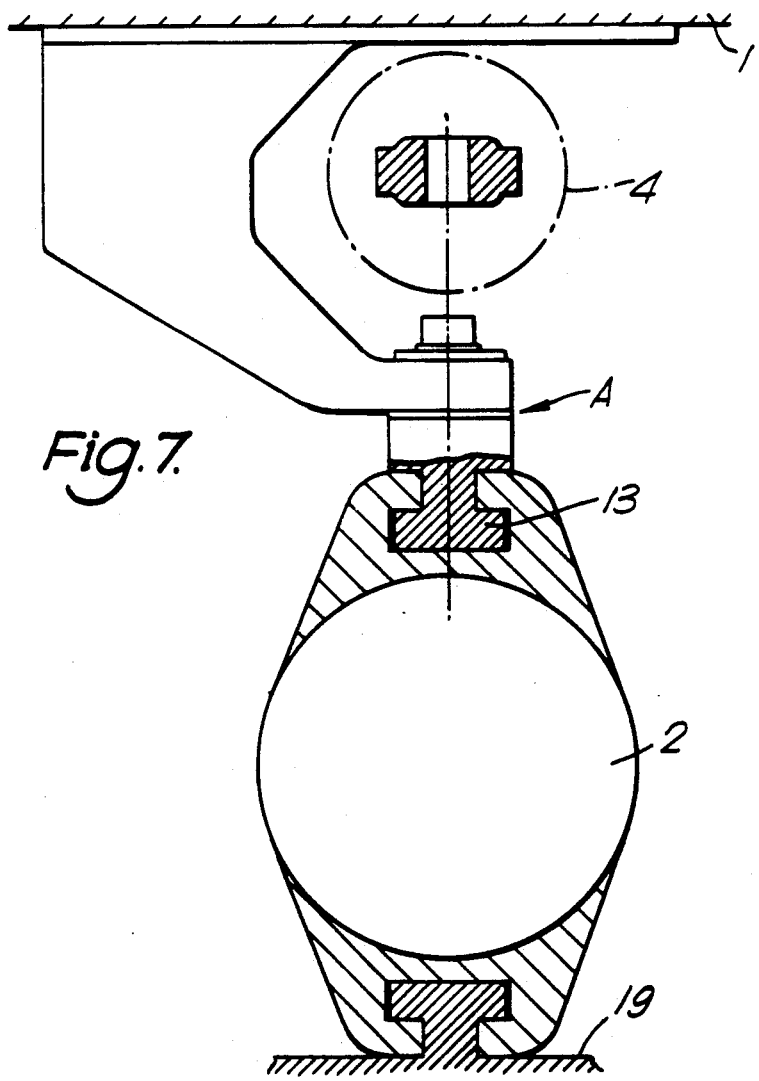

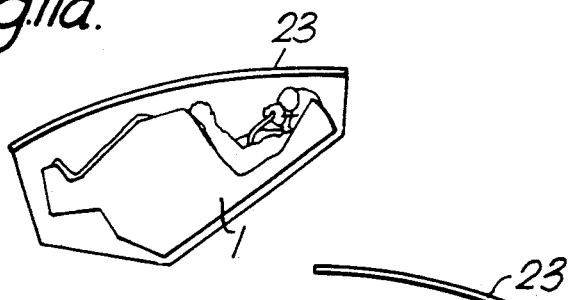
Fig.11a.
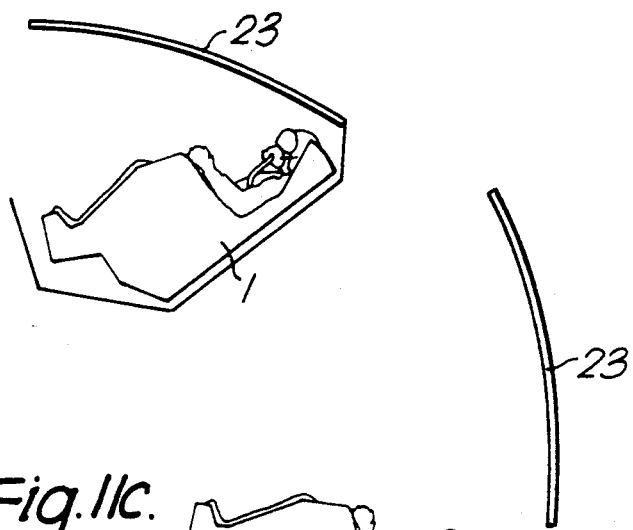
Fig.11b.
Fig.11c.
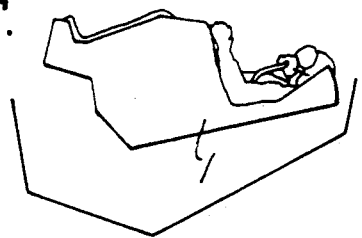
Fig.11d.
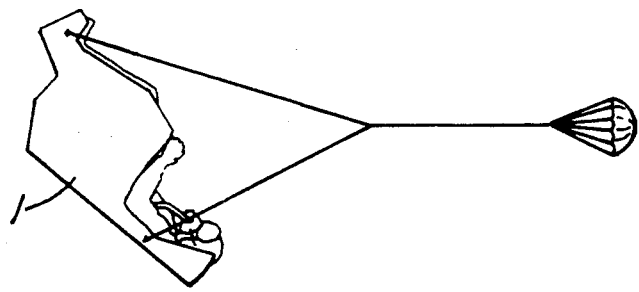
Fig.11e.
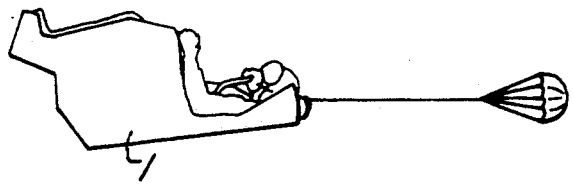

EJECTION SEATS FOR MILITARY AIRCRAFT

BACKGROUND OF THE INVENTION

This invention relates to improvements in cockpits for military aircraft and in particular, to improvements which protect the pilot of such an aircraft from the adverse effects of high "g" forces and laser weapons.

It has been found that when an aircraft is carrying out manoeuvres involving forces of more than 8 g, the pilot needs to be in an almost supine position if he is to remain conscious (even when wearing the conventional "g" suits).

Ejection seats which are moveable from an upright position to a reclining position have been proposed for use in high speed aircraft. See, for example, U.S. Pat. No. 3,981,465 (Sinnett et al). For most flying operations, the pilot selects the upright position. For high-speed manoeuvres, he reclines the seat so that his tolerance to "g" forces is improved.

U.S. Pat. No. 3,981,465 (Sinnett et al), however provides no solution to the problem of protecting the pilot from a laser attack via the transparent aircraft canopy.

It is an object of this invention to provide an ejection seat which will facilitate the protection of the pilot from high "g" forces and from laser weapons.

It is a further object of the invention to provide an ejection seat in which the ejection sequence can be initiated when the seat is in any of its operating configurations.

SUMMARY OF THE INVENTION

The invention therefore consists of an ejection seat assembly having a seat frame which is pivotably mounted on ejection guide rails for rotational motion about an translational motion with respect to said guide rails.

By virtue of the invention, the pilot is able to move his seat from a high position where he has the usual field of view for operations such as take-off and landing, and a low position within the fuselage, away from laser attack via the aircraft's windscreen or canopy. In addition he has the facility to recline the seat for high "g" manoeuvres.

Rotational and translational movement of the seat may be achieved by means of hydraulic actuators.

Preferably two ejection guide rails are employed, one located either side of the seat. Preferably, the guide rails incorporate conventional ejection guns, ejection being initiated in the known manner.

It has been found that in order to operate the flying controls (i.e. control column and throttle) in a supine position under high g, it is necessary to incorporate arm supports with the ejection seat.

It has further been found that the most comfortable type of armrest incorporated with the ejection sea according to the invention should provide support for the pilot's elbow and forearm and that the armrest should be adjustable fore and aft so that the pilot's elbow can be positioned most comfortably. Optionally, the armrest may carry aircraft control levers such as the throttle, stick and rudder pedals, all of which may be adjustable for reach.

The design philosophy of the ejection seat according to the invention is a complete departure from the conventional method of raising or lowering the seating platform to achieve a common eye datum, irrespective of size of pilot. The eye datum is not now considered as critical with the seat reclined and no external view being possible. Furthermore, the need to raise and lower the seat in order to reach and operate controls and the ability for the pilot to rotate his arm about the shoulder are no longer relevant. An anthropometric survey concluded that the pilot's elbow would have to be located into the corner of an armrest so that adequate support for the forearm at very high "g" values could be provided. The survey also concluded that the armrest should be adjustable fore and aft to accommodate pilots of different size. The range of adjustment within the survey was found to be 66 mm of fore and aft movement.

A suitable armrest for incorporation with the invention is that type described in our co-pending European Patent Application 91100151 corresponding to U.S. Ser. No. 07/648,987 to Ash et al.

BRIEF DESCRIPTION OF THE DRAWING

Some embodiments of the invention will now be described, by way of example only, with reference to the drawings, of which:

FIGS. 1a, 1b and 1c show three side views of an ejection seat in accordance with the invention in three different positions of deployment;

FIGS. 2 and 3 are side-views of a cockpit incorporating the ejection seat of FIG. 1;

FIG. 6 is a side view of the ejection seat of FIG. 1a shown in greater detail;

FIG. 7 is a sectional view along a line I—I' of FIG. 6;

FIGS. 11a to 11e show the flight of the ejection seat of FIG. 1 during an ejection sequence.

DETAILED DESCRIPTION OF THE PREFERRED EMBODIMENTS

Figure 1A:
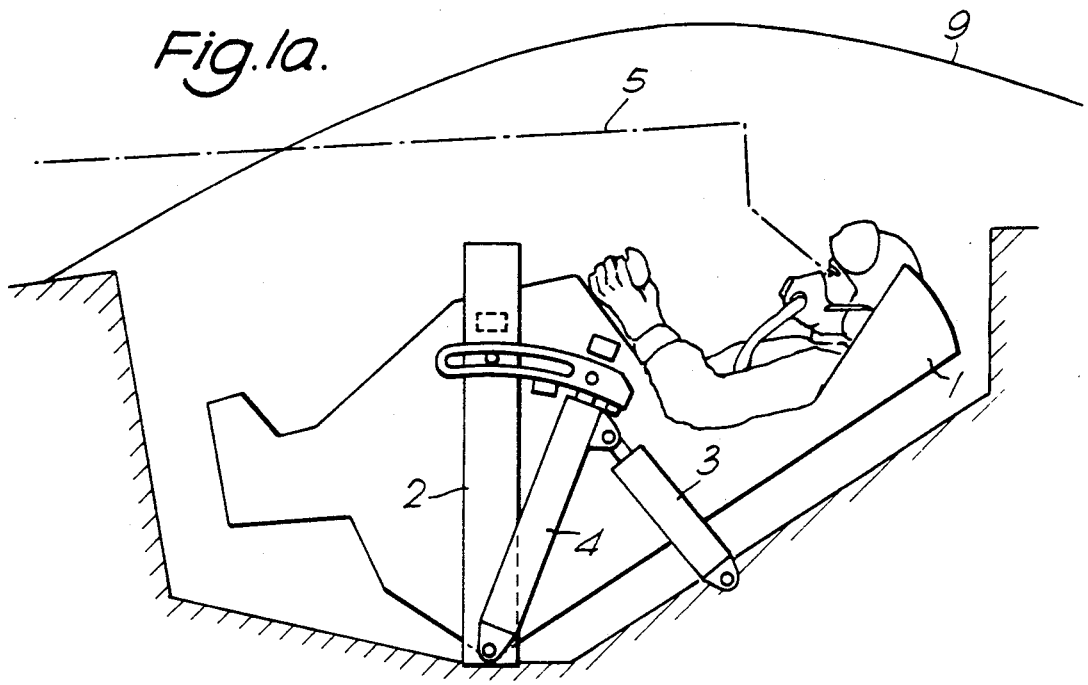
Figure 1B:
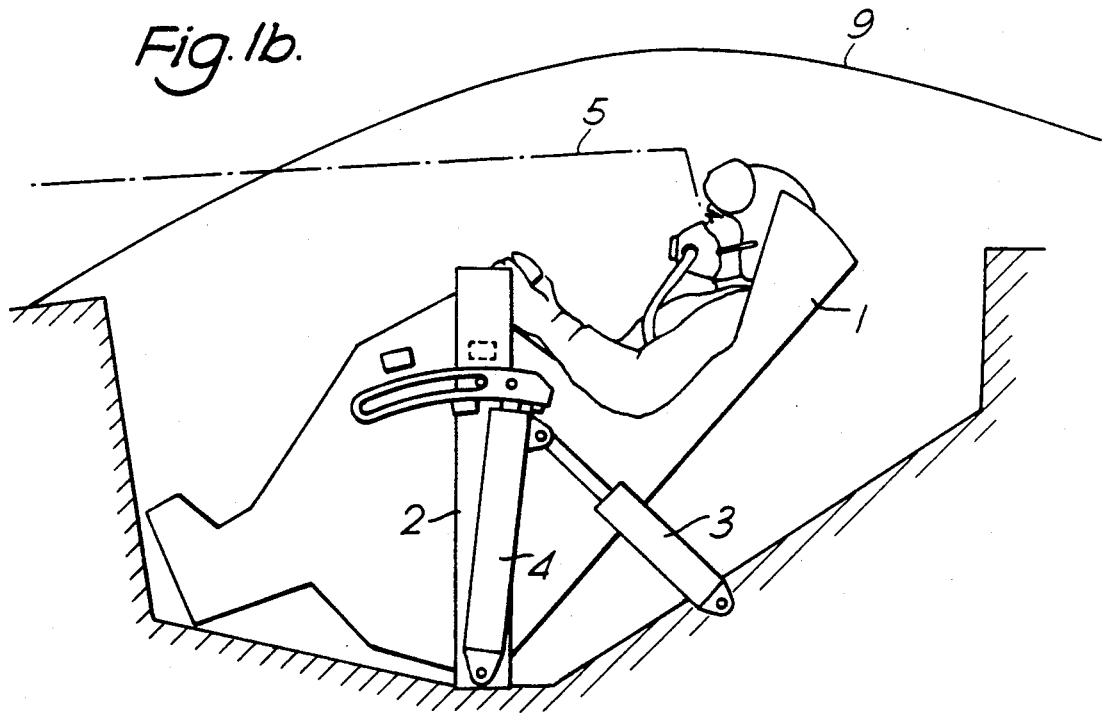

FIG. 1 shows an ejection seat 1 having one pair of ejection guns 2 located on either side of the seat (only one gun being shown here for clarity), and a pair of actuators 3 and 4 for bringing about rotational and translational movement of the seat 1 respectively.

A pair of such actuators are located either side of the seat 1.

The locus of the pilot's eye 5 is shown for each of three positions 1a, 1b, and 1c, of the seat 1. Position 1a shows the seat in a fully reclining position at approximately 65° to the vertical, 1b shows the seat rotated through approximately 21° to a more upright intermediate position, and 1c shows the seat raised on its guide rails without any further rotation from position 1b. This last function serves to give adjustment for the full range of aircrew from 3% ile to 99% ile to a common eye datum with an external view.

Figure 4:
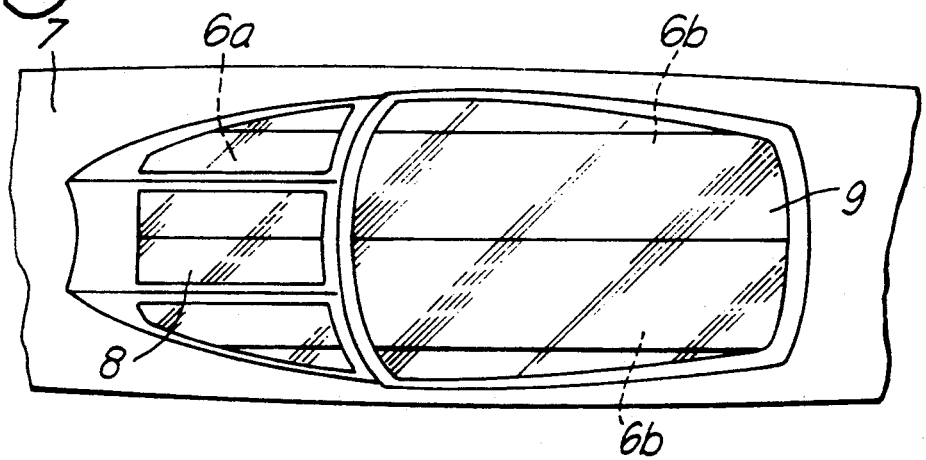
FIG. 4 is a plan view of the cockpit of FIG. 2.

Position 1a is chosen by the pilot for maximum protection from laser radiation attack and/or when sustaining high "g" manoeuvres. Whilst this situation prevails, he may deploy laser shields 6a and 6b (see FIGS. 2, 4 and 5) for further protection, which are driven by motors (controlled by the pilot) from retracted positions in the nose portion 7 and fuselage of the aircraft to positions covering the windshield 8 and the aircraft's cockpit 9 respectively. The shields 6a and 6b are made from any suitable material resistant to laser-induced damage.

Figure 5:
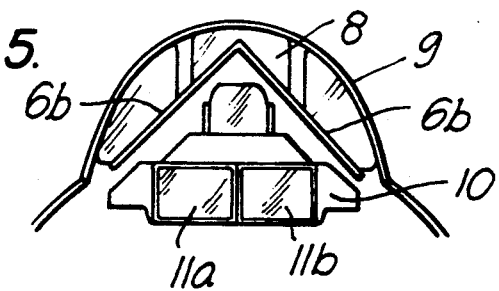
FIG. 5 is a sectional view along a line A—A of FIG. 2.
Figure 8:
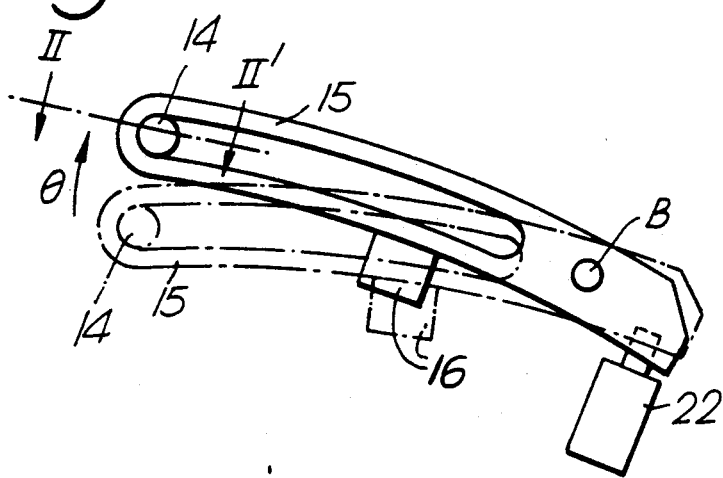
FIG. 8 is a detailed view of part of the mechanism shown in FIG. 6.
Figure 9:
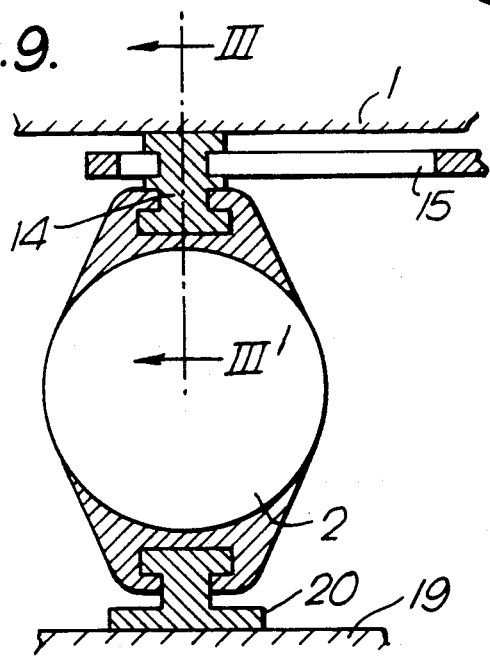
FIG. 9 is a sectional view along a line II—II' of FIG. 8.
Figure 10:
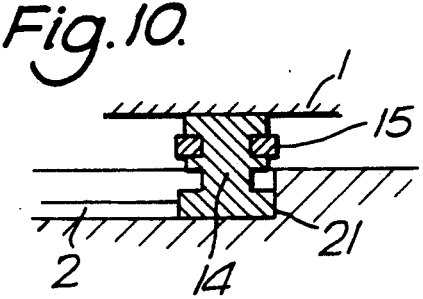
FIG. 10 is a sectional view along a line III—III' of FIG. 9.

Whilst in the reclining position, and unable to see through the windshield 8, the pilot deploys a head-down display 10 (see FIGS. 2 and 5). The display 10 comprises two panels 11a and 11b which fold outward away from the pilot's line of sight when not required. The panels 11a and 11b comprise a liquid crystal display which displays computer generated images of geographical features and data which relate to the area over which the pilot is flying. Methods of generating images suitable for this purpose are described in our co-pending European Patent Application no. EP-A-0,399,670 corresponding to U.S. Ser. No. 07/523,245 to Schofield et al.

Figure 3:
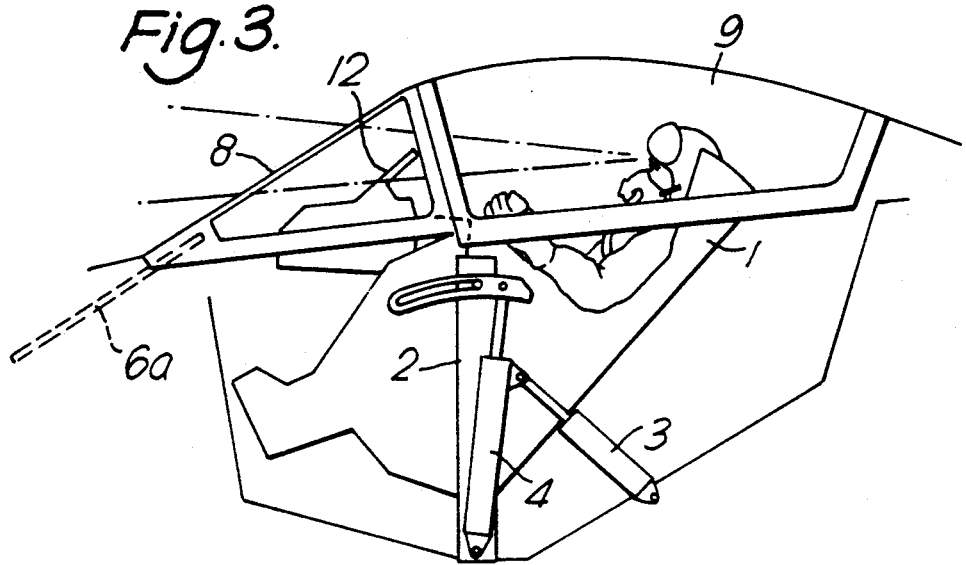

FIG. 3 shows the seat 1 in its most upright position corresponding to FIG. 1c. In this position the pilot uses a conventional head-up display 12 and with the laser shields 6a and 6b retracted, is permitted a 20° field of view in elevation through the windshield 8.

The operation of the ejection seat of FIG. 1 will now be described with reference to FIGS. 6 to 10.

The seat mountings detailed in FIG. 6 form an integral part of the ejection seat. They allow translation between a supine configuration for high "g" tolerance and a conventional seating position.

Ejection is possible in either the supine or conventional position as well as at any position during the transition between the two positions.

FIG. 6 shows the mountings in the supine configuration corresponding to FIG. 1a.

The seat chassis 1 is suspended within the cockpit envelope by the pairs of actuators 3, 4 (one pair on each side of the seat) and the ejection guns 2.

The seat 1 is attached to the outer part of each ejection gun 2 via two sliders 13 and 14. A first slider 13 is pivotally attached to the lower part of the seat 1 at point A. A second slider 14 is attached to the upper part of the seat 1 and is free to run along an arcuate track 15 which incorporates a lock 16. The track 15, is releasably connected to the seat 1 by means of the lock 16 and pivotally connected to the seat 1 at one of the track's extremities, designated point B. The actuators 3 and 4 are fixed at their lower ends to the cockpit floor. The moveable, inner rod of the actuator 3 is rigidly connected to the upper end of actuator 4. The moveable inner rod of actuator 4 is fixed to the track 15 close to point B.

At both extremes of movement of the seat 1 (supine and conventional) the seat chassis 1 is mechanically locked to the guns by one of two pairs of mechanical locks 17 and 18 (mounted on the seat 1), to provide the required rigidity for flight manoeuvres. The lock 16 mounted on each arcuate track 15 prevents rotation of the tracks 15 with respect to the seat 1.

In order for the seat to move from its supine position to the conventional position, the mechanical locks 17 are released so that the seat chassis 1 becomes free to rotate about point A although still supported by actuators 3 and 4.

The actuators 3 are extended hydraulically causing the seat to rotate about point A until the lock 18 mates with the gun 2 and prevents the seat 1 and track 15 from moving any further.

Next, actuators 4 are extended hydraulically causing the seat 1 to translate upwards guided by sliders 13 and 14.

The ejection sequence is as follows:

The mechanical locks 16, and 17 or 18 (depending on seat position) are released.

The guns 2 fire and begin to accelerate away from the cockpit floor, guided along the cabin wall 19, by sliders 20.

The movement of the guns 2 causes the slider 14 to engage with a stop 21 in the slot in the gun tube 2 (see FIG. 10) causing the slider 14 to move with the gun.

As the gun 2 continues to move upwards relative to the aircraft the slider 14 cause track 15 to rotate about point B.

As the track 15 rotates the actuator 4 is released from the track 15 by shearing its mounting pins.

The track 15 is caused to rotate until it reaches its limit, constrained by the slider 14 and arrested by a damper 22. (See FIG. 8).

This rotation of the track 15 causes there to be a tendency for the seat 1 to rotate. The action of the guns 2 still accelerating and pushing the slider 14 against track 15 (which is now at a gradient to the seat) causes the seat to rotate by the angle $\theta$ (if the seat was originally in the supine position). As the seat 1 begins to clear the cockpit envelope the rotation provides the pilot with airstream blast protection as his footbox is raised due to the rotation. This should enable ejection to take place at any position of the seat, orientation of the aircraft and at high speed in excess of what is currently possible (due to physiological limitations).

If ejection occurs during the transition or while in the upright seating position, the seat rotates back through the supine position and then by the angle $\theta$.

FIGS. 11a through 11e show the path of the ejection seat 1, pilot and canopy 23 during the ejection process.

We claim:

1. An ejection seat assembly for an aircraft having a canopy, the assembly comprising:
    a seat in which an occupant having eyes sits;
    ejection guide rails along which the seat can be ejected along an ejection axis; and
    mounting means for pivotally and slidably mounting said seat on said ejection guide rails, said mounting means comprising a means for permitting rotational movement of said seat with respect to said guide rails between a supine position and a more upright position and for permitting translational movement with respect to said guide rails between an upper position at which the occupant's eyes are above a lowest part of the canopy and a lower position at which the occupant's eyes are below said lowest part of the canopy, said means for permitting rotational and translational movement comprises a slider for allowing said translational movement and ejection, and an arcuate track means, connected to said seat and along which said slider runs, for allowing said rotational movement.

2. An ejection seat assembly according to claim 1, further including hydraulic actuator means for effecting independent rotational and translational movement of said seat relative to said mounting means.

3. An ejection seat assembly according to claim 2, wherein said arcuate track means cooperates with said hydraulic actuator means and permits rotational movement of the seat.

4. An ejection seat assembly according to claim 1, wherein, during ejection of said seat, said slider cooperates with said arcuate track means and together comprises a means for causing said seat to decline to said supine position.

5. An aircraft, said aircraft including:
a canopy;
deployable laser shields for preventing laser radiation from passing through said canopy; and
an ejection seat assembly comprising:
   a seat in which an occupant having eyes sits;
   ejection guide rails along which the seat can be ejected along an ejection axis; and
   mounting means for pivotally and slidably mounting said seat on said ejection guide rails, said mounting means comprising a means for permitting rotational movement of said seat with respect to said guide rails between a supine position and a more upright position and for permitting translational movement with respect to said guide rails between an upper position at which the occupant's eyes are above a lowest part of the canopy and a lower position at which the occupant's eyes are below said lowest part of the canopy, said means for permitting rotational and translational movement and ejection, and an arcuate track means, connected to said seat and along which said slider runs, for allowing said rotational movement.

* * * * *